(12) United States Patent
Schmidt et al.

(10) Patent No.: US 11,746,060 B2
(45) Date of Patent: Sep. 5, 2023

(54) METHOD FOR MANUFACTURING A COMPOSITE MATERIAL PART USING A HYBRID CROSS-LINKED COPOLYMER

(71) Applicants: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR); UNIVERSITE DE MONTPELLIER, Montpellier (FR); ECOLE NATIONALE SUPERIEURE DE CHIMIE DE MONTPELLIER, Montpellier (FR)

(72) Inventors: Marion France Hélène Schmidt, Moissy-Cramayel (FR); Samuel Jean-Charles Bernard, Saint-Just-le-Martel (FR); Nicolas Eberling-Fux, Moissy-Cramayel (FR)

(73) Assignees: CENTRE NATIONAL DE LA RECHERCHE SCIENTIFIQUE, Paris (FR); SAFRAN CERAMICS, Le Haillan (FR); UNIVERSITE DE BORDEAUX, Bordeaux (FR); UNIVERSITE DE MONTPELLIER, Montpellier (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 0 days.

(21) Appl. No.: 18/008,579

(22) PCT Filed: Jun. 2, 2021

(86) PCT No.: PCT/FR2021/050997
§ 371 (c)(1),
(2) Date: Dec. 6, 2022

(87) PCT Pub. No.: WO2021/250340
PCT Pub. Date: Dec. 16, 2021

(65) Prior Publication Data
US 2023/0192559 A1 Jun. 22, 2023

(30) Foreign Application Priority Data

Jun. 9, 2020 (FR) ...................................... 2005990

(51) Int. Cl.
*C04B 35/80* (2006.01)
*C04B 35/626* (2006.01)
(Continued)

(52) U.S. Cl.
CPC .......... *C04B 35/80* (2013.01); *C04B 35/6269* (2013.01); *C04B 35/62871* (2013.01);
(Continued)

(58) Field of Classification Search
CPC .................................................. C04B 41/5006
See application file for complete search history.

(56) References Cited

U.S. PATENT DOCUMENTS

| 5,128,494 A | 7/1992 | Blum |
| 5,204,380 A | 4/1993 | Seyferth et al. |

(Continued)

FOREIGN PATENT DOCUMENTS

| CN | 110944963 A | 3/2020 |
| EP | 0 212 485 A2 | 3/1987 |

(Continued)

OTHER PUBLICATIONS

Written Opinion of the International Searching Authority as issued in International Patent Application No. PCT/FR2021/050997, dated Aug. 30, 2021.

(Continued)

*Primary Examiner* — Robert A Vetere
(74) *Attorney, Agent, or Firm* — Pillsbury Winthrop Shaw Pittman LLP

(57) ABSTRACT

A method for manufacturing a part made of composite material includes forming a ceramic matrix phase in pores of a fibrous preform by pyrolysis of a cross-linked copolymer ceramic precursor, the cross-linked copolymer including a first precursor macromolecular chain of a first ceramic having free carbon, and a second precursor macromolecular chain of a second ceramic having free silicon, the first macromolecular chain being bonded to the second macromolecular chain by cross-linking bridges including a bond-
(Continued)

ing structure of formula $*^1$—X—$*^2$; in this formula, X designates boron or aluminium, -$*^1$ designates the bond to the first macromolecular chain and -$*^2$ the bond to the second macromolecular chain.

11 Claims, 3 Drawing Sheets

(51) Int. Cl.
  *C04B 35/628*  (2006.01)
  *C04B 35/64*  (2006.01)
  *C08G 79/08*  (2006.01)
  *C08G 77/62*  (2006.01)
  *C04B 35/632*  (2006.01)

(52) U.S. Cl.
  CPC ...... *C04B 35/62886* (2013.01); *C04B 35/632* (2013.01); *C04B 35/64* (2013.01); *C08G 77/62* (2013.01); *C08G 79/08* (2013.01); *C04B 2235/3856* (2013.01); *C04B 2235/3873* (2013.01); *C04B 2235/483* (2013.01); *C04B 2235/486* (2013.01); *C04B 2235/5252* (2013.01); *C04B 2235/616* (2013.01); *C04B 2235/721* (2013.01)

(56) References Cited

U.S. PATENT DOCUMENTS

| | | |
|---|---|---|
| 5,229,468 A | 7/1993 | Jensen |
| 5,459,114 A | 10/1995 | Kaya et al. |
| 2004/0019230 A1 | 1/2004 | Kroschel et al. |
| 2007/0093587 A1* | 4/2007 | Shen ............... F16D 69/023 |
| | | 524/404 |
| 2008/0207430 A1 | 8/2008 | Clade et al. |
| 2013/0011675 A1* | 1/2013 | Clade ............... C08L 83/08 |
| | | 524/588 |
| 2020/0131090 A1 | 4/2020 | Eberling-Fux et al. |

FOREIGN PATENT DOCUMENTS

| | | |
|---|---|---|
| JP | S63-191832 A | 8/1988 |
| JP | S63-291880 A | 11/1988 |
| JP | H02-84437 A | 3/1990 |
| WO | WO 2006/136755 A2 | 12/2006 |
| WO | WO 2007/110183 A1 | 10/2007 |

OTHER PUBLICATIONS

International Search Report as issued in International Patent Application No. PCT/FR2021/050997, dated Aug. 30, 2021.

* cited by examiner

[Fig. 1]
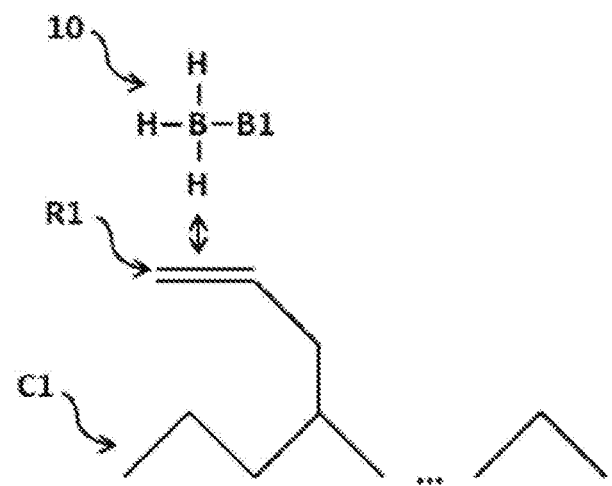
[Fig. 2]
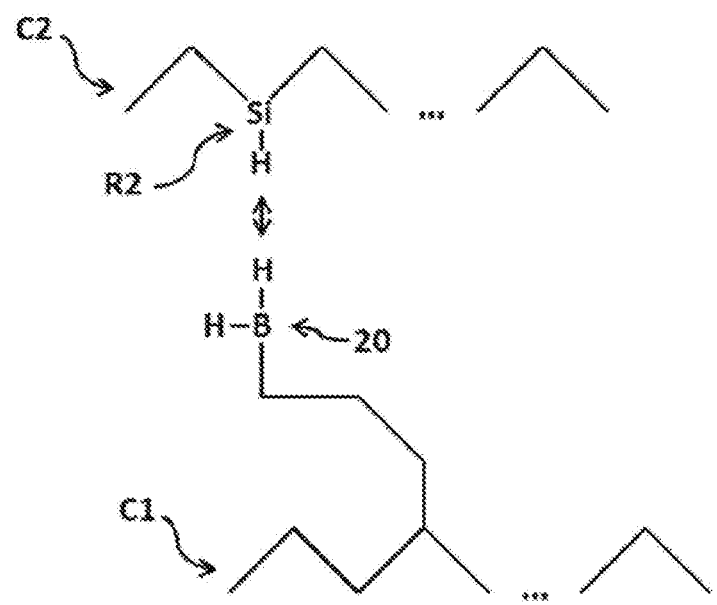

[Fig. 3]
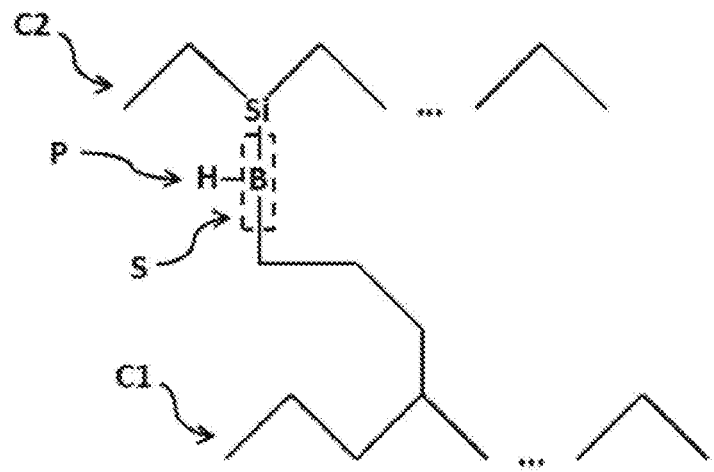
[Fig. 4]
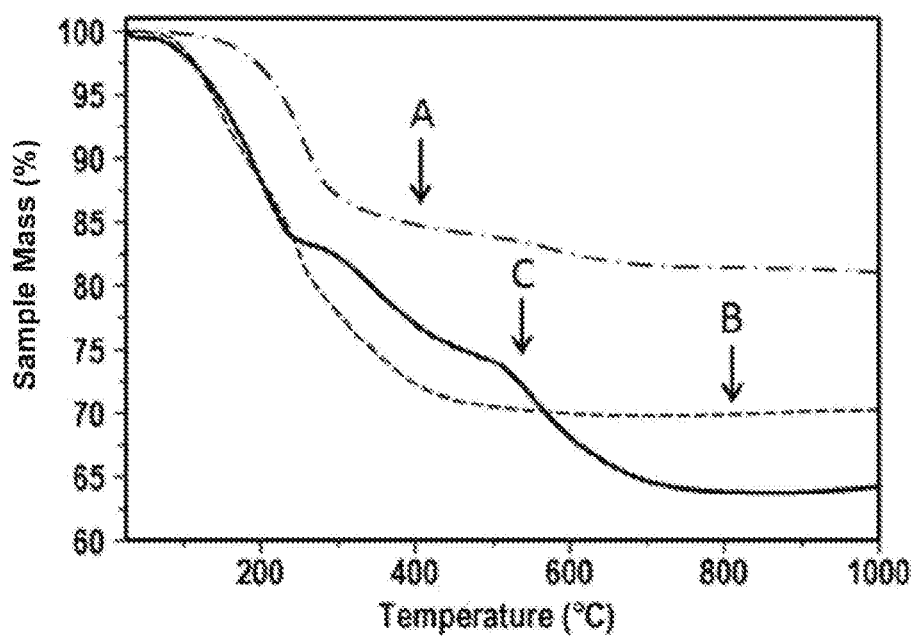

[Fig. 5]
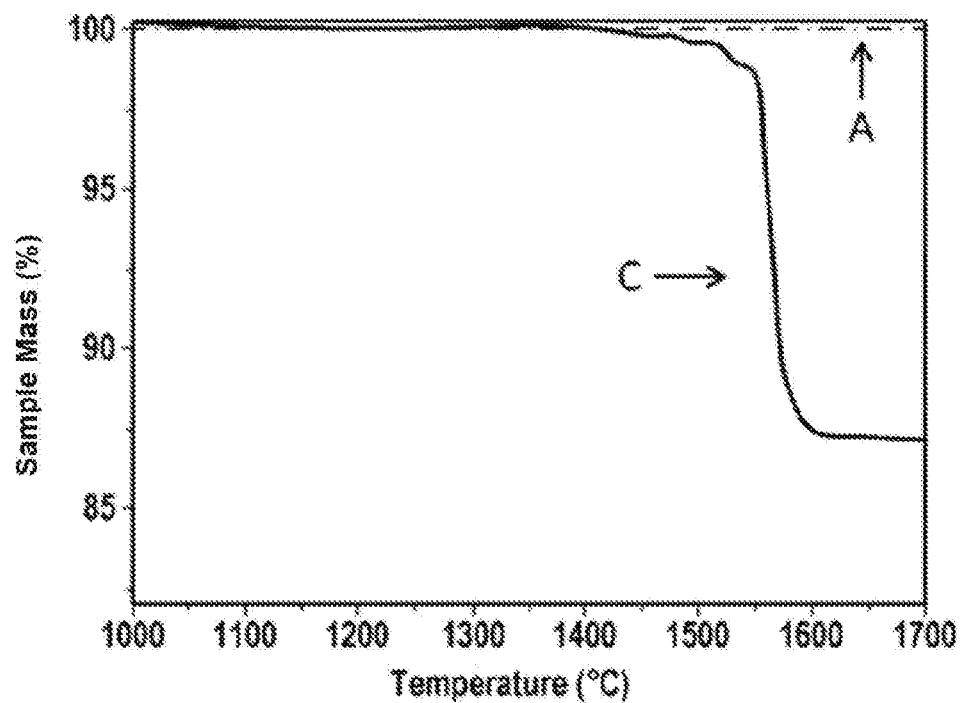

METHOD FOR MANUFACTURING A COMPOSITE MATERIAL PART USING A HYBRID CROSS-LINKED COPOLYMER

CROSS-REFERENCE TO RELATED APPLICATIONS

This application is the U.S. National Stage of PCT/FR2021/050997, filed Jun. 2, 2021, which in turn claims priority to French patent application number 2005990 filed Jun. 9, 2020. The content of these applications are incorporated herein by reference in their entireties.

TECHNICAL FIELD

The present invention relates to a method for manufacturing a part made of composite material with an at least partially ceramic matrix having improved mechanical properties.

PRIOR ART

Parts made of composite material with an at least partially ceramic matrix can conventionally be obtained by a polymer impregnation and pyrolysis (PIP) technique. According to such a technique, a liquid composition comprising a ceramic precursor polymer is introduced into the pores of a fibrous preform. The composition thus introduced is next polymerised then pyrolysed in order to form the ceramic matrix phase. Various types of ceramic matrices can be formed by this method, depending on the choice of the precursor used. In particular, a polysilazane polymer can be used in order to obtain a silicon carbonitride matrix (SiCN), a polycarbosilane polymer in order to obtain a silicon carbide matrix (SiC) or a polysiloxane polymer in order to obtain a silicon oxycarbide matrix (SiCO).

It is usual to repeat these infiltration and pyrolysis cycles several times in a row, in order to obtain the desired level of porosity for the densified part, since the transformation into ceramic by pyrolysis involves a volume shrinkage.

The matrices based on silicon carbide or silicon carbonitride, obtained by pyrolysis of commercial precursors, can exhibit free carbon. The presence of free carbon can affect the oxidation resistance of the ceramic matrix and the free carbon can react with the silicon nitride that is optionally present resulting in a loss of nitrogen inducing a mass loss of the material and the creation of pores, altering the properties of the matrix at temperatures greater than 1450° C.

It is therefore desirable to have new solutions for improving properties exhibited by parts made of composite material, the matrix of which has been at least partially formed by a PIP technique. It is also desirable to improve the behaviour of matrices formed by the PIP technique in an oxidising medium and/or at temperatures greater than 1450° C.

DISCLOSURE OF THE INVENTION

A first aspect of the invention relates to a method for manufacturing a part made of composite material comprising at least:

forming a ceramic matrix phase in the pores of a fibrous preform by pyrolysis of a cross-linked copolymer ceramic precursor, said cross-linked copolymer comprising a first precursor macromolecular chain of a first ceramic having free carbon, and a second precursor macromolecular chain of a second ceramic having free silicon, the first macromolecular chain being bonded to the second macromolecular chain by cross-linking bridges comprising a bonding structure of formula $*^1$—X—$*^2$; in this formula, X designates boron or aluminium, -$*^1$ designates the bond to the first macromolecular chain and -$*^2$ the bond to the second macromolecular chain. The invention proposes forming a ceramic matrix phase by pyrolysis of a hybrid copolymer comprising the combination of a first macromolecular chain intended to form a first ceramic exhibiting free carbon and a second macromolecular chain intended to form a second ceramic exhibiting free silicon. The first and second macromolecular chains each correspond to resins that are known per se. The invention proposes combining them so as to consume the free carbon of the first ceramic by reaction with the free silicon of the second, thus improving the properties of the part, in particular with respect to the resistance to oxidation. In addition, the use of the cross-linked copolymer makes it possible to improve the ceramic yield after pyrolysis compared to the use of the first and second macromolecular chains alone. In the invention, the first and second macromolecular chains are bonded by cross-linking bridges comprising an atom X, the incorporation of which makes it possible to yet further improve the ceramic matrix phase properties, as will be described in the following.

In an exemplary embodiment, X is boron.

The incorporation of boron in the ceramic matrix phase obtained after pyrolysis makes it possible to yet further improve the thermal resistance of the matrix at temperatures greater than 1450° C. by forming a thermostable amorphous ceramic. Alternatively, X is aluminium.

The incorporation of aluminium in the ceramic matrix phase obtained after pyrolysis makes it possible to further improve the resistance to oxidation and to corrosion of the ceramic matrix phase obtained.

In an embodiment, the forming of the cross-linked copolymer comprises the cross-linking of the first macromolecular chain with the second macromolecular chain by reaction of reactive functions carried by these chains with a Lewis complex or Lewis acid cross-linking agent comprising X—H bonds, this reaction taking place at the atom X.

In this case, the cross-linking is carried out when the chains are already in the macromolecular state and already polymerised.

Alternatively, the forming of the cross-linked copolymer comprises the reaction of a Lewis complex or Lewis acid cross-linking agent comprising X—H bonds with reactive functions carried by monomers or oligomers intended to form the first and second macromolecular chains, this reaction taking place at the atom X, and the polymerisation of said monomers or oligomers.

In this case, the cross-linking is carried out when the chains are incompletely polymerised.

Whichever example is considered, the Lewis complex or acid comprises X—H bonds which are able to chemically react with the reactive functions. Following these reactions, the atom X is covalently bonded to the macromolecular chains and forms cross-linking bridges between these chains, as described above.

In particular, the cross-linking agent can react with at least one first reactive function chosen from: a carbon-carbon double bond, a $CH_3$ group or a C—OH group, and at least one second reactive function chosen from: an N—H group, Si—H group or an Si—OH group.

The first reactive function can belong to the first macromolecular chain or to the monomer or the oligomer intended to form this first chain, and the second reactive function can belong to the second macromolecular chain or to the monomer or the oligomer intended to form this second chain.

In particular, the first reactive function is a carbon-carbon double bond belonging, for example, to an allyl or vinyl group, and the second reactive function is an N—H group or a Si—H group.

In an embodiment, the cross-linking agent is a Lewis complex comprising a reactive structure of formula B1-XH$_2$, where B1 is a Lewis base.

In particular, the cross-linking agent can be a Lewis complex of general formula B1-BH$_3$ or B1-AlH$_3$.

The Lewis base B1 can be of formula *—S—R$_2$ or *—N—R$_3$, with *- designating the bond to the atom X and in each of these formulas the R groups being identical or different and being a saturated or unsaturated hydrocarbon chain having 1 to 12 carbon atoms, for example 1 to 4 carbon atoms, or B1 can be an aliphatic or aromatic hydrocarbon chain having 1 to 12 carbon atoms, for example 1 to 4 carbon atoms. The R groups can be chosen, in particular, from: a methyl group or an ethyl group. B1 can be a linear or branched hydrocarbon chain having 1 to 12 carbon atoms, for example 1 to 4 carbon atoms.

In particular, the cross-linking agent can be borane dimethylsulfide having the formula below:

[Chem.1]

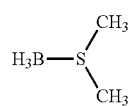

In particular, the cross-linking agent can be Alane N—N dimethylamine having the formula below:

[Chem.2]

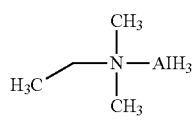

In particular, the cross-linking agent is a Lewis acid of general formula R'—BH$_2$ or R'—AlH$_2$, in each of these formulas the R' group being a hydrogen atom or a saturated or unsaturated hydrocarbon chain having 1 to 12 carbon atoms, for example 1 to 4 carbon atoms.

In an embodiment, the first macromolecular chain and the second macromolecular chain are, independently of one another, chosen from: polysiloxanes, polysilazanes, polycarbosiloxanes, polycarbosilanes, polycarbosilazanes or the mixtures of such resins.

BRIEF DESCRIPTION OF THE FIGURES

FIG. 1 schematically illustrates a step in the forming of a cross-linked copolymer that can be implemented within the scope of the invention.

FIG. 2 schematically illustrates a step in the forming of a cross-linked copolymer that can be implemented within the scope of the invention.

FIG. 3 schematically illustrates a step in the forming of a cross-linked copolymer that can be implemented within the scope of the invention.

FIG. 4 is a test result comparing the ceramic yield of a cross-linked copolymer that can be implemented in the scope of the invention with the ceramic yields obtained after pyrolysis of each of the macromolecular chains constituting same.

FIG. 5 is a test result comparing the thermal stability of the ceramic obtained from a cross-linked copolymer that can be implemented within the scope of the invention with that of the ceramic obtained from one of the macromolecular chains constituting same.

DESCRIPTION OF THE EMBODIMENTS

A fibrous preform forming the fibrous reinforcement of the part to be obtained can be produced from refractory yarns, such as ceramic or carbon yarns. The preform can be formed, for example, from silicon carbide yarns supplied by the Japanese company NGS under the reference "Nicalon", "Hi-Nicalon" or "Hi-Nicalon Type S". The carbon yarns that can be used to form this preform are supplied, for example, by Toray under the name Torayca T300 3K.

The fibrous preform is obtained from at least one textile operation. The fibrous preform can be obtained, in particular, by multilayer or three-dimensional weaving. The term "three-dimensional weaving" or "3D weaving" should be understood as meaning a method of weaving by which at least some warp threads connect weft threads over a plurality of weft layers. A reversal of the roles between warp and weft is possible in the present description and should also be considered to be covered by the claims.

The fibrous preform can have, for example, a multi-satin weave, in other words it may be a fabric obtained by three-dimensional weaving with a plurality of layers of weft yarns for which the basic weave of each layer is equivalent to a conventional satin weave but with certain points of the weave which bind the layers of weft yarns together. Alternatively, the fibrous preform can have an interlock weave. The term "interlock weave or fabric", should be understood to mean three-dimensional weaving, in which each layer of warp yarns connects a plurality of layers of weft yarns, with all the yarns of the same warp column having the same movement in the weave plane. Various multilayer weaving methods which can be used to form the fibrous preform are described in document WO 2006/136755.

It is also possible to first form fibrous textures such as two-dimensional fabrics or unidirectional sheets (i.e. formed of yarns extending substantially in a same direction), and to obtain the fibrous preform by draping such fibrous textures on a form. These textures can optionally be bonded together, for example by stitching or implantation of yarns in order to form the fibrous preform.

A coating can then be formed on the yarns of the preform. This coating can be an interphase and/or include one or more matrix phases partially densifying the fibrous preform. The coating can be made of carbon, in particular of PyC, of boron-doped carbon (BC, with boron in an atomic proportion between 5% and 20%, the remainder being carbon) or made of ceramic material, such as silicon carbide, boron nitride (BN), silicon-doped boron nitride (BN(Si), with silicon in a mass proportion between 5% and 40%, the remainder being boron nitride) or silicon nitride (Si$_3$N$_4$). The coating can comprise a single-layer or multilayer interphase. This interphase can include at least one layer of pyrolytic carbon, boron nitride, silicon-doped boron nitride or boron-doped carbon.

Here, the interphase has a de-embrittlement function for the composite material which promotes the diversion of possible cracks arriving at the interphase after having propagated in the matrix, preventing or delaying the rupture of the yarns by such cracks.

The thickness of the interphase can be between 10 nm and 1000 nm, and for example between 10 nm and 100 nm. The interphase can be formed by chemical vapour infiltration on the yarns of the preform.

Alternatively, it is possible to form the interphase by chemical vapour deposition on the yarns before forming the preform, then forming this preform from yarns coated in this way.

Alternatively, the coating may contain at least one preliminary matrix phase and optionally an interphase inserted between said at least one preliminary matrix phase and the yarns. The preliminary matrix phase can be formed by various known methods, such as chemical vapour infiltration, silicon melt-infiltration or by a PIP technique. The preliminary matrix phase can be ceramic or made of carbon. The preliminary matrix phase can be made of carbon, or even of PyC, made of silicon carbide, boron nitride or silicon nitride.

Of course, the fibrous preform remains porous after formation of the coating, in order to allow the formation of a ceramic matrix phase by pyrolysis of the cross-linked copolymer, as described above. An example of formation of a cross-linked copolymer that can be used within the scope of the invention will now be described in conjunction with FIGS. 1 to 3.

The resins constituting the first and second macromolecular chains, denoted C1 and C2 in FIGS. 1 to 3, can be mixed in the liquid state. A cross-linking agent 10 can then be added to this mixture. FIGS. 1 to 3 relate to the case of a cross-linking agent comprising boron, but the same principle applies in the case where this agent comprises aluminium.

The cross-linking agent 10 reacts with a first reactive function R1, here comprising a carbon-carbon double bond carried by a first macromolecular chain C1, as illustrated in FIG. 1. According to this example, the first chain C1 has a reactive allyl group; other examples of reactive groups with a double carbon-carbon bond are possible, such as a vinyl group for example. The first macromolecular chain C1 produces, after pyrolysis, a first ceramic having free carbon, for example with an atomic content greater than or equal to 5%, for example between 5% and 20%. The first ceramic can be silicon carbide, silicon carbonitride or silicon nitride. The first macromolecular chain C1 can comprise silicon and carbon and have an atomic ratio of Si/C less than 1, in other words an atomic content of carbon greater than the atomic content of silicon.

In the case of a first reactive function R1 comprising a carbon-carbon double bond, it can produce a radical addition reaction between the B—H bond of the cross-linking agent 10 and the C—C double bond and the loss of the Lewis base B1. B1 can be as described above. Thus, a covalent bond B—C is obtained between the macromolecular chain C1 and the cross-linking agent 10. Examples of resin constituting the first macromolecular chain C1 having a reactive function in the form of a carbon-carbon double bond include a polycarbosilane resin, such as that marketed under the reference "SMP-10" by Starfire® Systems, or a polysilazane resin, such as that marketed under the reference "Durazane 1800" by Merck or under the reference "HTT1800".

The cross-linking agent 20 having reacted with the first reactive function R1 has at least one other B—H bond capable of reacting with a second reactive function R2 carried by a second macromolecular chain C2 in order to bond thereto (see FIG. 2). According to this example, the second chain C2 has a reactive function R2, Si—H, it could alternatively or additionally have a reactive function N—H. The second macromolecular chain C2 produces, after pyrolysis, a second ceramic having free silicon, for example with an atomic content greater than or equal to 5%, for example between 5% and 20%. The second ceramic can be silicon carbide or silicon nitride. The second macromolecular chain C2 can comprise silicon and carbon and have an atomic ratio of Si/C greater than 1, in other words an atomic content of silicon greater than the atomic content of carbon.

The reactive function R2 can react with the B—H bond of the cross-linking agent via a dehydrocoupling reaction in order to form a B—Si bond in the case of a reactive function Si—H, or B—N in the case of a reactive function N—H. Examples of resin constituting the second macromolecular chain C2 include polysilazane resin perhydropolysilazane (PHPS), which comprises both of the reactive functions, N—H and Si—H.

After reaction of the cross-linking agent 10 with the reactive functions R1 and R2, a cross-linking bridge P is obtained between the macromolecular chains C1 and C2, with a bond structure S of formula $*^1$—B—$*^2$, which is framed by dashes in FIG. 3. The bond structure S forms a bond arm between the macromolecular chains C1 and C2.

By way of example, for a molar equivalent of the first macromolecular chain C1, it is possible to use between 2 and 3 molar equivalents of the second macromolecular chain C2. In general, the cross-linking agent can be present in the mixture with a ratio of 0.1 to 1.2 molar equivalents with respect to the quantity of the first macromolecular chain.

The cross-linking can be carried out at ambient temperature (20° C.). According to one example, the cross-linking can include at least one step at a temperature between −50° C. and 60° C., for example between −20° C. and 30° C., in order to attach the cross-linking agent to at least one of the reactive functions R1 and R2. This first step can be followed by a second step at a higher temperature, for example greater than or equal to 90° C., for example between 90° C. and 250° C., in order to finalise the cross-linking. The duration of this cross-linking can be greater than or equal to 30 minutes, for example between 30 minutes and 3 days, for example between 30 minutes and 5 hours.

A description has just been given, in conjunction with FIGS. 1 to 3, of a sequential bond of the cross-linking agent 10 on one chain C1 and then on the other C2, put a person skilled in the art will recognise that these bonds can be produced simultaneously. In addition, the illustrated example relates to the case of cross-linking of macromolecular chains C1 and C2 that are already formed but, as indicated above, it does not go beyond the scope of the invention when the cross-linking is made in the monomer or oligomer state. The same principle also applies to a cross-linking agent in the form of a Lewis acid.

The method can be carried out by injecting the cross-linked copolymer into the pores of the fibrous preform of the part to be obtained, then pyrolysing the copolymer that is introduced into the preform. A ceramic matrix phase is obtained with a low atomic content of free carbon, this content being, for example, less than or equal to 5%, for example less than or equal to 3%. After pyrolysis, a ceramic matrix phase Si—B—C—N can be obtained which is a thermostable ceramic at 1500° C. It should be noted that it is alternatively possible to inject the mixture, before the end of the cross-linking, into the pores of the fibrous preform and to proceed with the cross-linking in situ, in the pores of the preform, in order to obtain the cross-linked copolymer. Other methods are possible, such as the use of pre-impregnated fibrous layers of the mixture or of the cross-linked copolymer, following draping of these layers on a form of the part to be obtained. Whichever embodiment is considered, the cross-linked copolymer can substantially fill all of the accessible pores of the fibrous preform.

The forming of the mixture, the cross-linking, the optional injection of the cross-linked copolymer into the pores of the fibrous preform and the pyrolysis thereof can be carried out under an inert atmosphere.

It should be noted that forming of the matrix of the part can involve the performance of a plurality of cycles of introducing the mixture or copolymer and pyrolysis of the copolymer.

Once obtained, the part thus manufactured can be a part for aeronautical or aerospace application. The part may be a hot part of a gas turbine of an aeronautical or aerospace engine or of an industrial turbine. The part may be a turbomachine part. The part may constitute at least part of a distributor, at least part of a nozzle, or a thermal protection coating, a wall of a combustion chamber, an annular sector of a turbine or a turbomachine blade.

EXAMPLE

A mixture was produced under an inert atmosphere from two commercial polysilazanes (Durazane 1800, Si—C—N ceramic precursor containing free carbon, and PHPS, $Si_3N_4$ ceramic precursor containing free silicon, both marketed by Merck) and a boron-based cross-linking agent: borane dimethylsulfide (BDMS, marketed by Sigma-Aldrich; 2M in toluene). 2 equivalents of PHPS were added for 1 equivalent of Durazane. The polymers were first mixed then diluted in toluene before adding, drop-by-drop, a controlled quantity of borane dimethylsulfide under stirring at 0° C. using a dropping funnel. 0.1 equivalents of borane dimethylsulfide were added for 1 equivalent of Durazane.

After addition, the temperature was increased naturally to ambient temperature (20° C.) and the assembly was kept for 3 days under stirring at this temperature. The solvent was then extracted between 30° C. (disappearance of the majority of residual borane dimethylsulfide) and 60° C. (disappearance of the majority of toluene), a temperature which was maintained for 1 hour under dynamic vacuum in order to obtain the cross-linked copolymer.

The copolymer was then pyrolysed under nitrogen while raising the temperature to 1000° C. in order to convert to Si—B—C—N ceramic. The ceramic obtained had a low atomic content of free carbon, of order 5 atomic percent, due to the reaction thereof with the free silicon from the PHPS during the pyrolysis.

FIG. 4 compares the ceramic yield of the copolymer obtained (curve "A") with those obtained for PHPS (curve "B") and Durazane 1800 (curve "C") alone. It is observed that the ceramic yield of the copolymer is much higher than the ceramic yield of the two other polymers alone, not combined.

In addition, FIG. 5 shows that the ceramic obtained after pyrolysis of the copolymer has an increased thermostability compared with the ceramic obtained after pyrolysis of Durazane 1800 alone. The ceramic obtained after pyrolysis of the copolymer does not exhibit any mass loss effect up to 1700° C.

The expression "between . . . and . . . " should be understood to include the limits.

The invention claimed is:

1. A method for manufacturing a part made of composite material comprising:
    forming a ceramic matrix phase in pores of a fibrous preform by pyrolysis of a cross-linked copolymer ceramic precursor, said cross-linked copolymer comprising a first precursor macromolecular chain of a first ceramic having free carbon, and a second precursor macromolecular chain of a second ceramic having free silicon, the first macromolecular chain being bonded to the second macromolecular chain by cross-linking bridges comprising a bonding structure of formula $*^1$—X—$*^2$; in this formula, X designates boron or aluminium, -$*^1$ designates the bond to the first macromolecular chain and -$*^2$ the bond to the second macromolecular chain.

2. The method according to claim 1, wherein X is boron.

3. The method according to claim 1, wherein the forming of the cross-linked copolymer comprises the cross-linking of the first macromolecular chain with the second macromolecular chain by reaction of reactive functions carried by these chains with a Lewis complex or Lewis acid cross-linking agent comprising X-H bonds, this reaction taking place at the atom X.

4. The method according to claim 1, wherein the forming of the cross-linked copolymer comprises the reaction of a Lewis complex or Lewis acid cross-linking agent comprising X-H bonds with reactive functions carried by monomers or oligomers intended to form the first and second macromolecular chains, said reaction taking place at the atom X, and the polymerisation of said monomers or oligomers.

5. The method according to claim 3, wherein the cross-linking agent reacts with at least one first reactive function chosen from: a carbon-carbon double bond, a $CH_3$ group, a C-OH group, and at least one second reactive function chosen from: an N-H group, Si-H group or an Si-OH group.

6. The method according to claim 5, wherein the first reactive function is a carbon-carbon double bond and the second reactive function an N-H group or an Si-H group.

7. The method according to claims 3, wherein the cross-linking agent is a Lewis complex comprising a reactive structure of formula B1-$XH_2$, where B1 is a Lewis base.

8. The method according to claim 7, wherein the cross-linking agent is a Lewis complex of general formula B1-$BH_3$ or B1-$AlH_3$.

9. The method according to claim 7, wherein the Lewis base B1 is of formula *—S—$R_2$ or *—N—$R_3$, with *- designating the bond to the atom X and in each of these formulas the R groups being identical or different and being a saturated or unsaturated hydrocarbon chain having 1 to 12 carbon atoms, or wherein B1 is an aliphatic or aromatic hydrocarbon chain having 1 to 12 carbon atoms.

10. The method according to claim 3, wherein the cross-linking agent is a Lewis acid of general formula R'—$BH_2$ or R'—$AlH_2$, in each of these formulas the R' group being a hydrogen atom or a saturated or unsaturated hydrocarbon chain having 1 to 12 carbon atoms.

11. The method according to claim 1, wherein the first macromolecular chain and the second macromolecular chain are, independently of one another, chosen from: polysiloxanes, polysilazanes, polycarbosiloxanes, polycarbosilanes, polycarbosilazanes or the mixtures of such resins.

* * * * *